(12) United States Patent
Chen

(10) Patent No.: US 7,103,765 B2
(45) Date of Patent: Sep. 5, 2006

(54) METHOD AND SYSTEM FOR PROVIDING A MODULIZED SERVER ON BOARD

(76) Inventor: Ben Wei Chen, 1400 Tolteca Ct., Fremont, Alameda, CA (US) 94539

(*) Notice: Subject to any disclaimer, the term of this patent is extended or adjusted under 35 U.S.C. 154(b) by 0 days.

(21) Appl. No.: 10/002,652

(22) Filed: Oct. 19, 2001

(65) Prior Publication Data

US 2003/0061474 A1 Mar. 27, 2003

Related U.S. Application Data

(60) Provisional application No. 60/324,900, filed on Sep. 25, 2001.

(51) Int. Cl.
*G06F 1/24* (2006.01)
*G06F 12/00* (2006.01)

(52) U.S. Cl. ............................... 713/2; 713/1; 713/100; 711/100

(58) Field of Classification Search ........................ 713/1, 713/2, 100; 711/100; 361/684, 685
See application file for complete search history.

(56) References Cited

U.S. PATENT DOCUMENTS

| | | | |
|---|---|---|---|
| 5,751,714 A | 5/1998 | Albano et al. | |
| 5,889,970 A | 3/1999 | Horan et al. | |
| 5,974,547 A | 10/1999 | Klimenko | |
| 5,987,536 A | 11/1999 | Johnson et al. | |
| 6,115,755 A | 9/2000 | Krishan | |
| 6,256,732 B1 * | 7/2001 | Cromer et al. | 713/2 |
| 6,282,643 B1 * | 8/2001 | Cromer et al. | 713/2 |
| 6,408,333 B1 | 6/2002 | St. Clair | |

FOREIGN PATENT DOCUMENTS

EP   1113646 A1   7/2001

* cited by examiner

Primary Examiner—Rehana Perveen
(74) Attorney, Agent, or Firm—Sawyer Law Group LLP

(57) ABSTRACT

A method and system for providing a modulized server-on-a-board is disclosed. The server-on-a-board is installed on a computing device. The method and system include providing bus interface logic, providing local control BIOS, a flash memory and a set of control button connectors, light emitting diodes (LED) connectors and a liquid crystal display (LCD) connector. The local control BIOS is coupled with the bus interface logic and the flash memory. The bus interface logic interacts with the computing device and allows computing device to detect the server board. The local control BIOS boots up the server and prepares the computing device for use as the server. The flash memory stores a server image for the server, which is provided to the computing device using the local control BIOS. The control button connectors allow the server to be turned on, shut down gracefully, or restored to its initial state, by a single press of buttons connected to these connectors. The LED and LCD connectors allow the system status to be displayed or shown.

24 Claims, 11 Drawing Sheets

METHOD AND SYSTEM FOR PROVIDING A MODULIZED SERVER ON BOARD

CROSS-REFERENCE TO RELATED APPLICATION

This application is claiming under 35 USC 119(c) the benefit of provisional patent Application Ser. No. 60/324,900 filed Sep. 25, 2001.

FIELD OF THE INVENTION

The present invention relates to computer systems, and more particularly to a method and system for providing a server on a generalized computing device.

BACKGROUND OF THE INVENTION

FIG. 1 depicts a generalized computing device ("computing device") 10. The computing device 10 includes at least a CPU 12 and an optional mass storage 18, such as a hard disk. The computing device 10 may also include other features. The computing device depicted in FIG. 1 also includes a memory 14 such as a flash memory, a display 16, an input/output device 20 such as a keyboard, BIOS 22, a network interface 24 and a bus interface 26. Communication to a network (not shown) is carried out through the network interface 24. Similarly, communication to any attached devices (not shown) can be carried out via the bus interface 26. For example, the bus interface 26 could include interfaces for PCI, USB, SCSI, IDE, Infiniband or other connectors.

The computing device 10 is capable of performing a variety of functions. It is often desirable to utilize the computing device 10 as a server. A server would include additional hardware and/or software that allows the server to serve multiple users. Thus, the server would allow multiple users to share resources, such as printers or the optional mass storage 18 of the computing device 10.

There are a number of conventional methods for allowing the computing device 10 to be used as a server. In general, these conventional methods involve obtaining server software and installing the software on the computing device 10. The user must then manually set up the desired functions for the server. Alternatively, the computing device 10 could be specially built to function as a server. In either case, ensuring that the computing device 10 can function as a server is expensive. For example, obtaining and installing server software on the computing device 10 or specially building the computing device 10 may cost between $500 and $5,000. Moreover, installing the software and tailoring the system to provide the desired individual functions requires a substantial investment of time on the part of the user.

Accordingly, what is needed is a system and method for cheaply and easily allowing the computing device 10 to be used as a server. The present invention addresses such a need.

SUMMARY OF THE INVENTION

The present invention provides a method and system for providing a server on a computing device. The computing device includes at least a processor and an optional mass storage device. The method and system comprise providing bus interface logic, providing local control BIOS, a flash memory and, preferably, a set of control button connectors, light emitting diodes (LED) connectors and a liquid crystal display (LCD) connector. The local control BIOS is coupled with the bus interface logic and the memory. The bus interface logic interacts with the computing device and allows the computing device to detect the system. The local control BIOS boots up the server and prepares the computing device for use as the server. The memory stores a server image for the server, which is provided to the computing device using the local control BIOS. The control button connectors allow the server to be turned on, shut down gracefully, or restored to its initial state, by a single press of buttons connected to these connectors. The LED and LCD connectors allow the system status to be displayed or shown.

According to the system and method disclosed herein, the present invention provides an inexpensive, easy to use mechanism for allowing the computing device to be used as a server.

DETAILED DESCRIPTION OF THE INVENTION

The present invention relates to an improvement in computer systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for providing a modulized server on a board. The server-on-a-board is installed on a computing device. The method and system include providing bus interface logic, providing local control BIOS, flash memory and, preferably, a set of control button connectors, light emitting diodes (LED) connectors and a liquid crystal display (LCD) connector. The local control BIOS is coupled with the bus interface logic and the flash memory. The bus interface logic interacts with the computing device and allows computing device to detect the server board. The local control BIOS boots up the server and prepares the computing device for use as the server. The flash memory stores a server image for the server, which is provided to the computing device using the local control BIOS. The control button connectors allow the server to be turned on, shut down gracefully, or restored to its initial state, by a single press of buttons connected to these connectors. The LED and LCD connectors allow the system status to be displayed or shown.

The present invention will be described in terms of a particular computing device and a system having certain components. However, one of ordinary skill in the art will readily recognize that this method and system will operate effectively for other computing devices and other systems having other components performing substantially the same functions.

Figure 1:
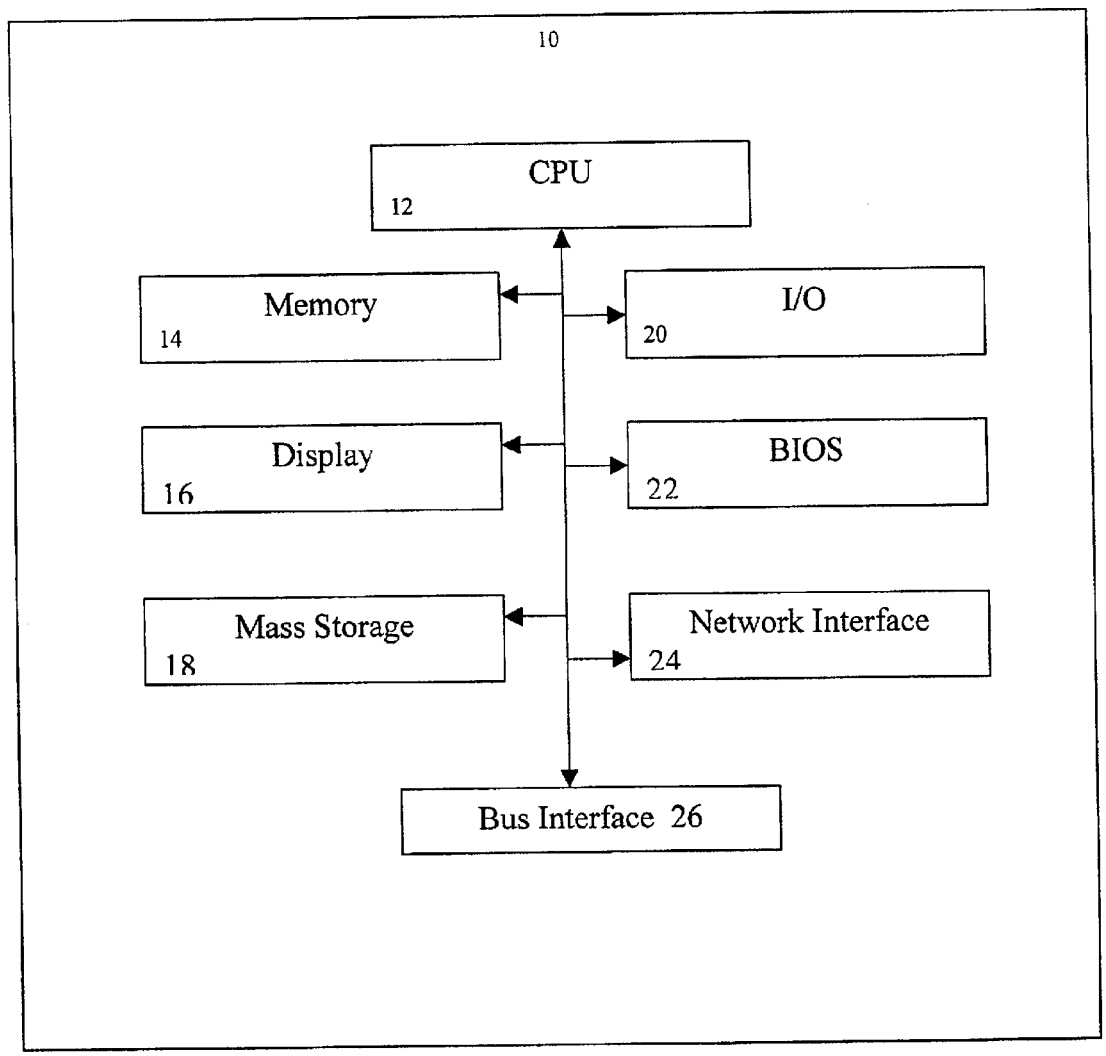
FIG. 1 is a block diagram of a conventional computing device.
Figure 2:
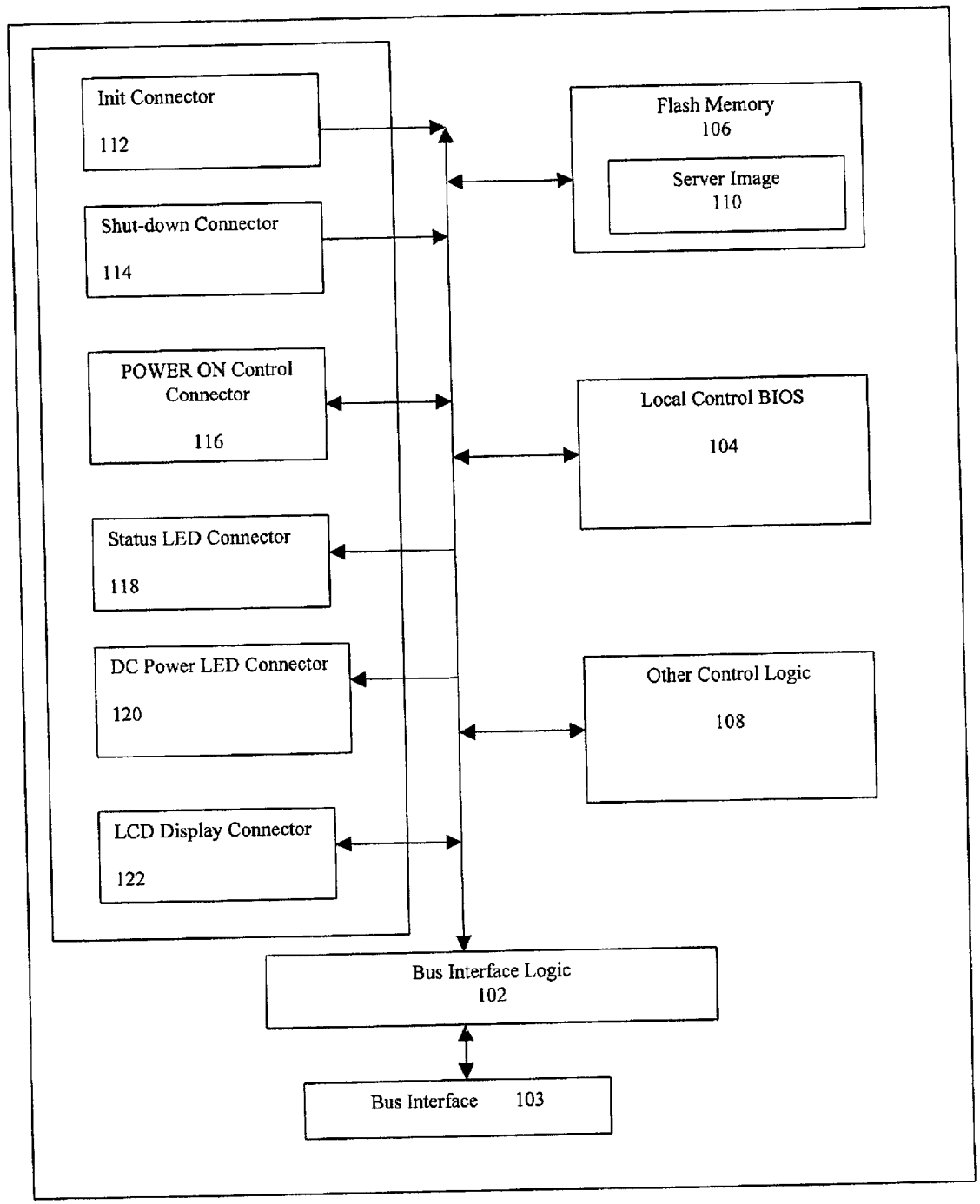
FIG. 2 is a high level block diagram of a system in accordance with the present invention for allowing the computing device to be used as a server.

To more particularly illustrate the method and system in accordance with the present invention, refer now to FIG. 2, depicting a high-level block diagram of a system 100 in accordance with the present invention for allowing the computing device to be used as a server. The system 100 is to be used in conjunction with a computing device such as the computing device 10. The system 100 includes bus interface logic 102, local control BIOS 104, memory 106 and, in a preferred embodiment, other control logic 108 and connectors 109. The components 102, 104, 106, 108 and 109 of the system 100 are preferably integrated into a single board that can be plugged into the computing device 10. The system 100 is also preferably used in conjunction with a system having a generic user interface, such as Windows 2000® operating system. The system 100 attaches to the computing device 10 via the bus interface logic 102 and bus interface 103 of the system 100 and the bus interface 26 of the computing device 10. In operation, the computing device 10 detects the system 100 through the bus interface logic 102, using the bus protocols of the computing device 10. The local control BIOS 104 boots up the server and prepares the computing device for use as the server. The memory 106 includes a server image 110 for the server being provided by the system 100. Preferably, the server image 110 is compressed and stored on the memory 106. The server image 110 is preferably loaded onto the computing device 10 and boots up, as discussed below. Once booted up, the server image 110 allows the computing device 10 to function as a server. In addition, the system 100 also includes the other control logic 108. In a preferred embodiment, the other control logic 108 is managed by the local control BIOS 104. The connectors 109 preferably include an Init connector 112, a shut-down connector 114, a power control connector 116, a status LED connector 118, a DC power LED connector 120 and a LCD display connector 122. However, in another embodiment, the other control logic 108 could include other components. The connectors 109 can be coupled to LEDs (not shown) and an LCD display (not shown) for the board. The connectors 109 are controlled using the other control logic 108.

Figure 3:
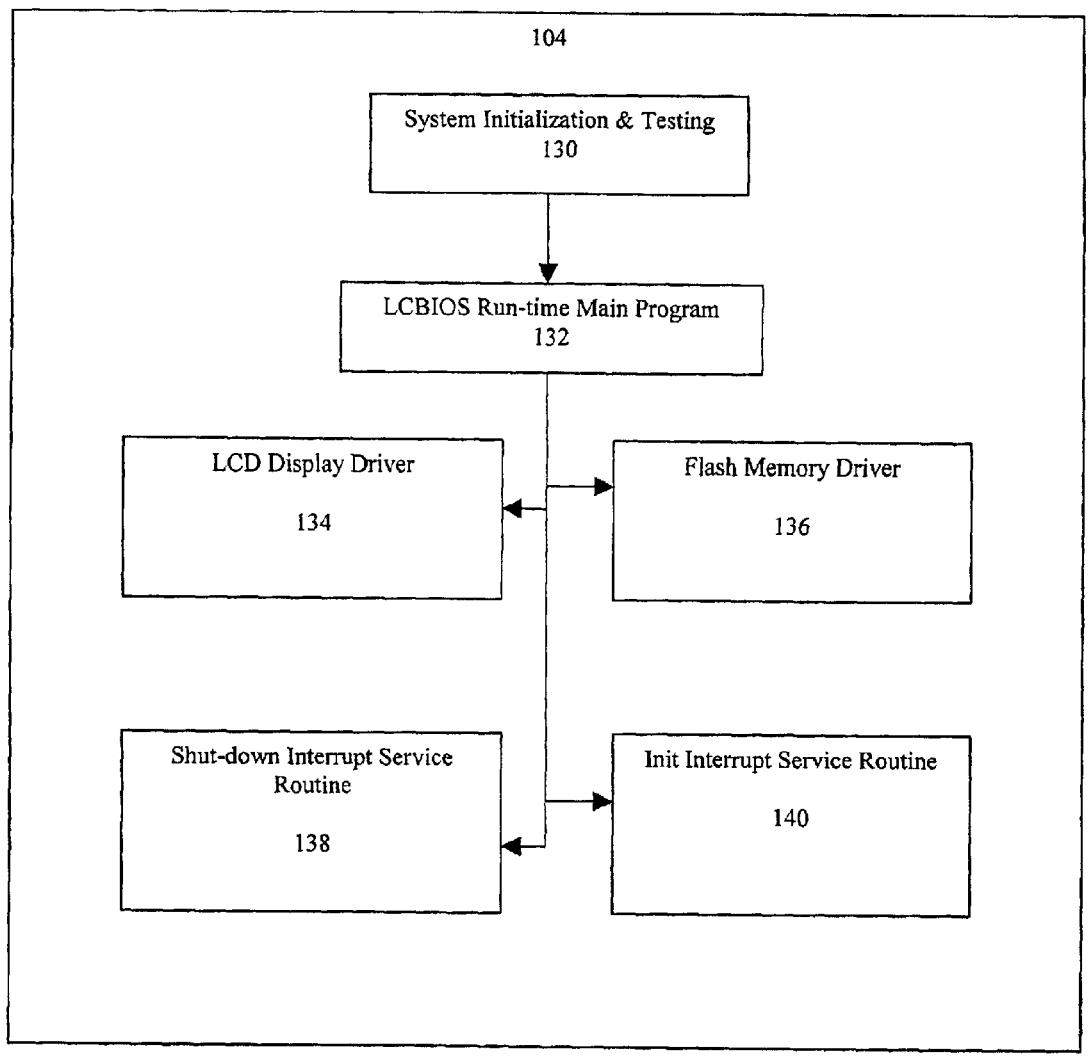
FIG. 3 is a block diagram of one embodiment of the BIOS of the system in accordance with the present invention for allowing the computing device to be used as a server.

FIG. 3 depicts one embodiment of the local BIOS 104. The local BIOS 104 includes a system initialization and testing block 130, a local BIOS run-time main program 132, an LCD display driver 134, a memory driver 136, a shut-down interrupt service routine 138, and an Init service routine 140. The drivers 134 and 136 are used to drive the display 122 and the memory 106. The shut-down interrupt service routine 138 and Init service routine 140 are used in conjunction with the other control logic 108 described below.

Referring to FIGS. 2 and 3, in operation, once the computing device 10 detects the presence of the system 100, the local BIOS 104 is activated. The local BIOS 104 preferably connects with the BIOS 22 and begins controlling the computing device 10. The local BIOS 104 preferably performs tests on the system 100 to ensure that the system 100 can control the functions of the computing device 10 as desired. For example, the local control BIOS 104 ensures that the display, memory and other input/output devices can be controlled. For example, in a preferred embodiment, the hardware identification of the flash memory 106 is read to determine the size of the memory 106. The system initialization and testing block 130 preferably performs the testing functions. An Ethernet MAC address of the computing device 10 is also preferably read to ensure that security and personalization of the computing device 10 is preserved. In a preferred embodiment, an identification for the system 100 is read by the local control BIOS 104 to determine a version of the system 100. The local control BIOS 104 also preferably establishes a unique personalized key, discussed below. The local control BIOS 104 establishes a boot-up sequence on the computing device 10. The memory 106 is then mounted and boots up. The server image 110 is then extracted from the memory 106 using the unique personalized key. Without the key, the server image preferably cannot extract and utilize the server image 110.

Figure 4:
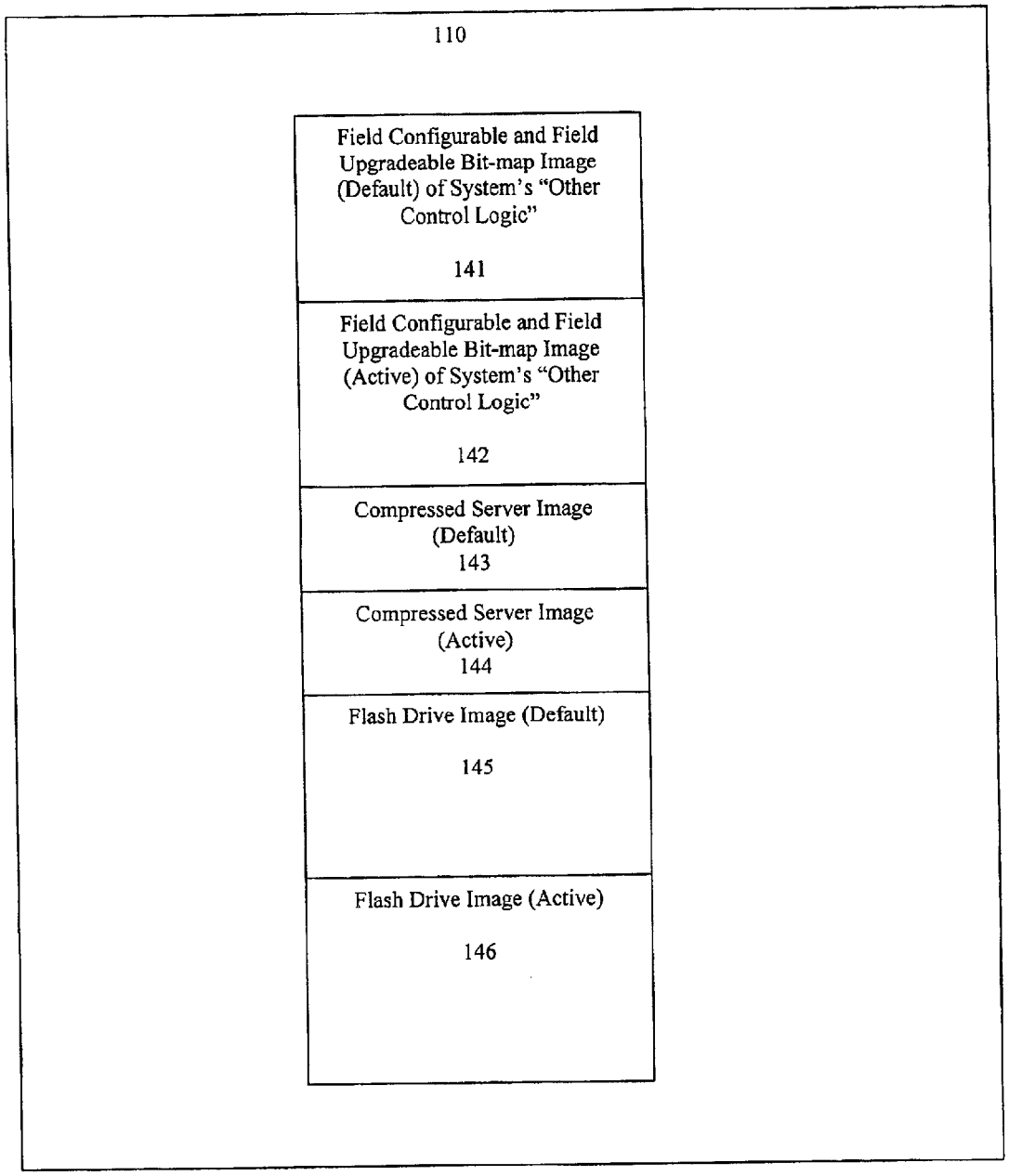
FIG. 4 is a diagram of one embodiment of the image of the server stored in the memory of the system in accordance with the present invention for allowing the computing device to be used as a server.

FIG. 4 is a diagram of one embodiment of the images for the server stored in the memory 106. The server image 110 includes a default field configurable and field upgradeable bitmap image 141 of the other control logic 108, an active field configurable and field upgradeable bitmap image 142 of the other control logic 108, a default compressed server image 143, an active server image 144, a default flash drive boot-up image 145 and an active flash drive boot-up image 146. The bitmaps 141 and 142 indicate the default and actual (active) bitmap images for the control logic to allow the server to track and utilize the control logic 108. The compressed server images 143 and 144 are the default and actual (active) server images for loading onto the computing device 10. The active server image 144 thus corresponds to the server image 110, depicted in FIG. 2, that is loaded onto the computing device. The flash drive images 145 and 146 are the default and actual (active) boot-up images of the flash memory 106. Once the server image 110 is loaded on the computing device 10, the computing device 10 can function as a server. Furthermore, the defaults can be restored, for example in an Init interrupt, described below in FIG. 10, using the defaults 141, 143 and 145. The shut-down interrupt service routine 138 and Init service routine 140 can optionally reside in the server image of 110 as well.

Figure 5:
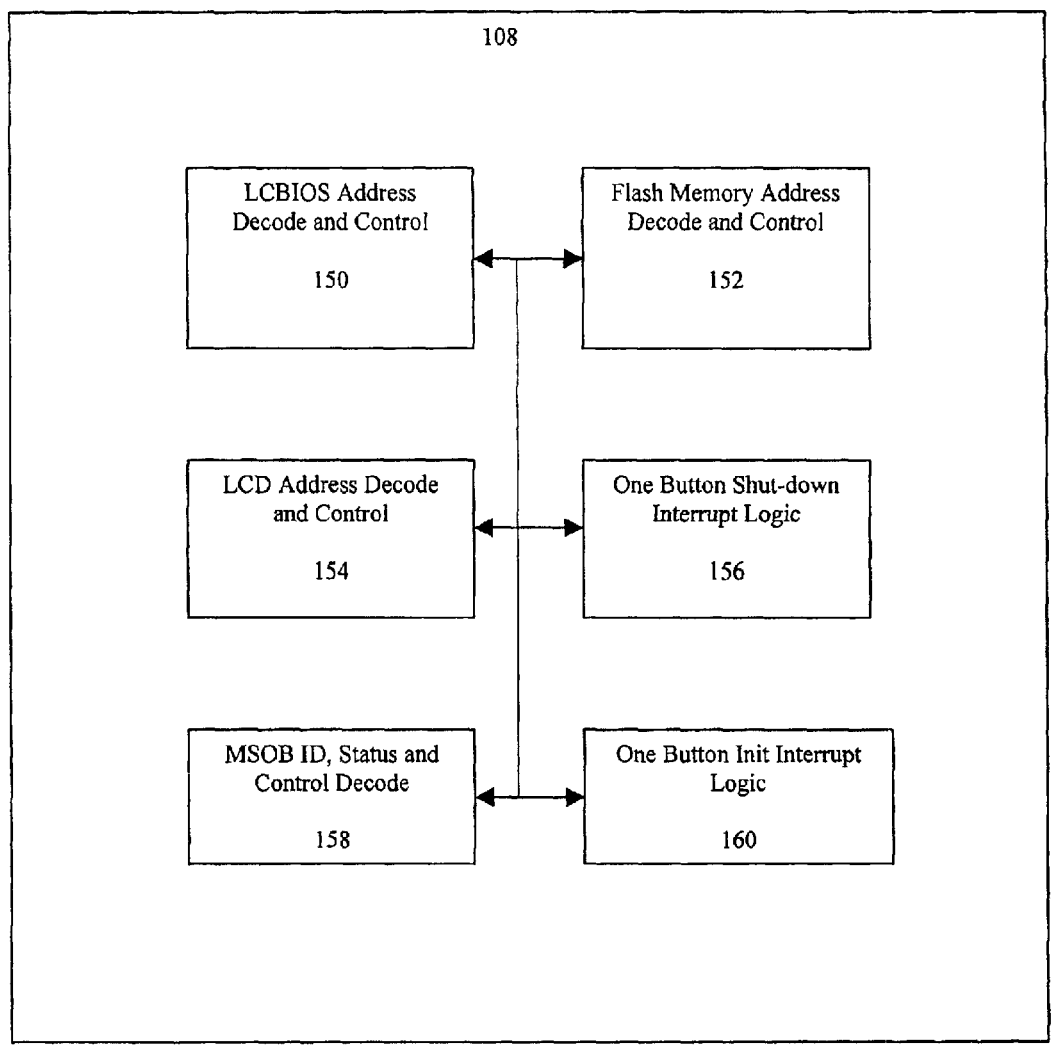
FIG. 5 is a more detailed block diagram of one embodiment of the other control logic in the system in accordance with the present invention for allowing the computing device to be used as a server.

FIG. 5 is a more detailed block diagram of one embodiment of the other control logic 108 in the system 100 in accordance with the present invention for allowing the computing device to be used as a server. The other control logic 108 includes a local BIOS 104 address decode and control 150, a flash memory address decode and control 152, an LCD address decode and control 154, one button shut-down interrupt logic 156, ID, status and control decode 158 and one button Init interrupt logic 160. These blocks are used to provide the additional functions, described below, such as a one button shut down and Init interrupt.

Figure 6:
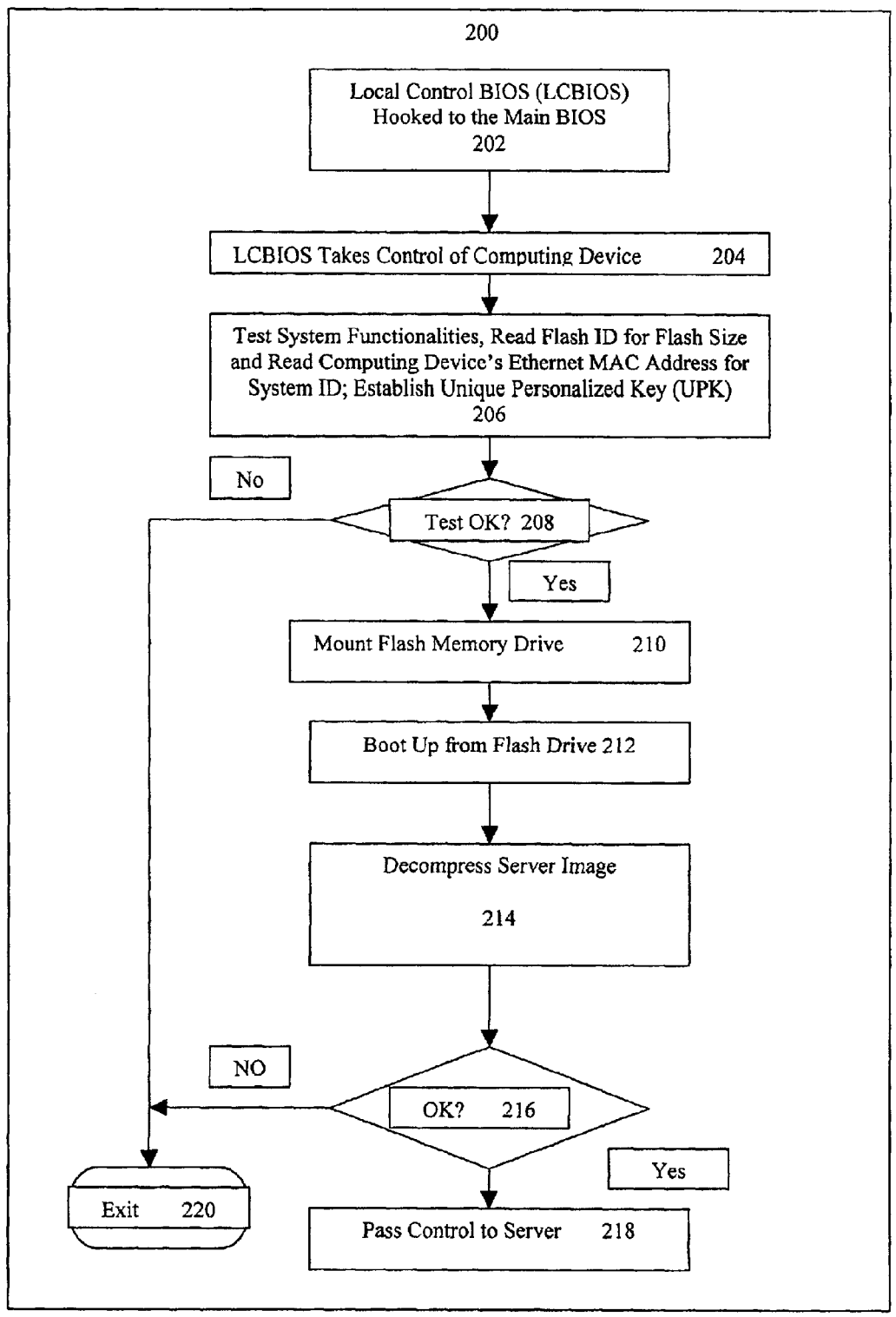
FIG. 6 is a flow chart of one embodiment of a method in accordance with the present invention for utilizing the system in accordance with the present invention to allow the computing device to be used as a server.

FIG. 6 is a flow chart of one embodiment of a method 200 in accordance with the present invention for using the system 100. The method 200 preferably commences after the computing device 10 has found the system 100. The method 200 is described in the context of the components depicted in FIGS. 1-5. Referring to FIGS. 1-6, the local control BIOS 104 is automatically coupled with the BIOS 22 of the computing device 10, via step 202. The local control BIOS 104 takes control of the computing device 10, via step 204. The functions of the system 100 are tested, via step 206.

It is determined whether the test(s) performed in step 206 indicate that the system 100 is functioning properly, via step 208. If not, then the method 200 terminates, via step 220. If it is determined that the system 100 runs properly, then the memory 106 is mounted on the computing device 10, via step 210. The boot up of the computing device 10 is then performed from the memory 106 that was just mounted, via step 212. The server image 110 is found, decompressed if necessary, via step 214. It is determined whether the functions of the method 200 were properly performed, via step 216. If so, then control is passed to the server, via step 218. Otherwise, the method 200 ends at step 220.

Thus, the method 200 and system 100 allow the computing device 10 to be used as a server. Because most of the method 200 is performed automatically, the user need not manually configure the computing device 10. Instead, the user merely plugs in the board on which the system 100 is integrated. Thus, the process used to allow a computing device 10 to be used as a server is simplified. Moreover, the system 100 is relatively inexpensive, often costing on the order of less than $25 in quantity. Thus, the computing device 10 can be turned into a server relatively cheaply and easily.

Figure 7:
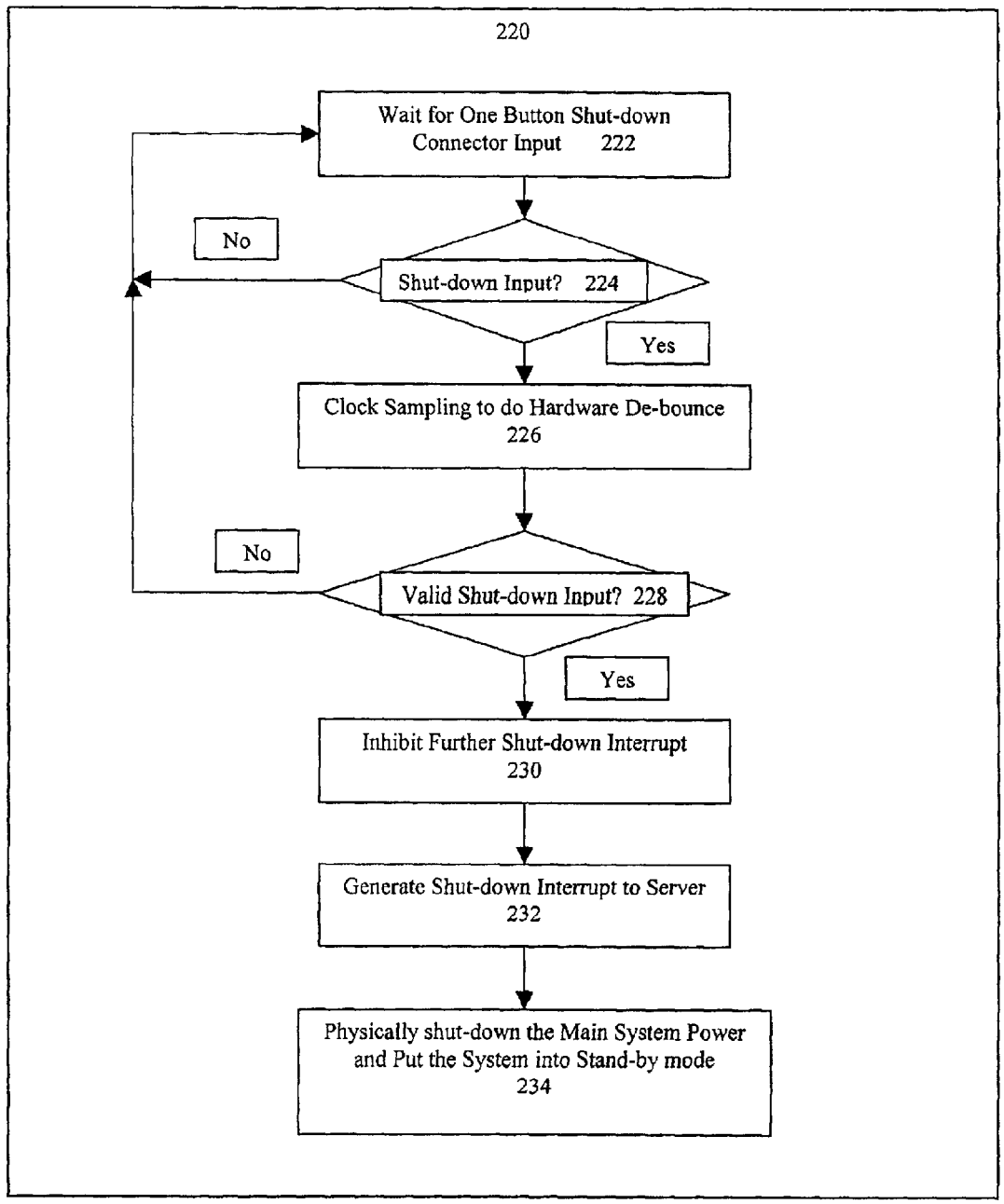
FIG. 7 is a flow chart of one embodiment of a method for using one-button shut down interrupt logic as a feature of the system in accordance with the present invention for allowing the computing device to be used as a server.

The system 100 also preferably uses the other controls 108 and connectors 109 to provide other functions in the server. FIG. 7 depicts one embodiment of a method 220 for utilizing one button shut-down interrupt logic 156 and the shut-down connector 114. The one button shut-down interrupt logic 156 waits for input, via step 222. In a preferred embodiment, the input includes a push button (not shown) being depressed for a particular time. It is determined whether shut-down input was received, via step 224. If not then step 222 is returned to. Otherwise, clock sampling is performed to allow for hardware debounce, via step 226. It is determined whether the input was valid shut-down input, via step 228. In a preferred embodiment, valid shut-down input includes the push button being depressed for a particular time. If the input was not valid, then step 222 is returned to. Otherwise, further shut-down interrupts are inhibited, via step 230. Step 230 ensures that the method 220 can be completed for the valid shut down input already provided. A shut down interrupt to the server is then generated, via step 232. A method for generating such an interrupt is described below with respect to FIG. 8. The main system power is then shut down and the system 100 is put into stand-by mode, via step 234. Thus, the system 100 can be shut down using a single press of a button. A user can, therefore, shut down the server provided using the system 100 relatively quickly and easily, through the use of a single button.

Figure 8:
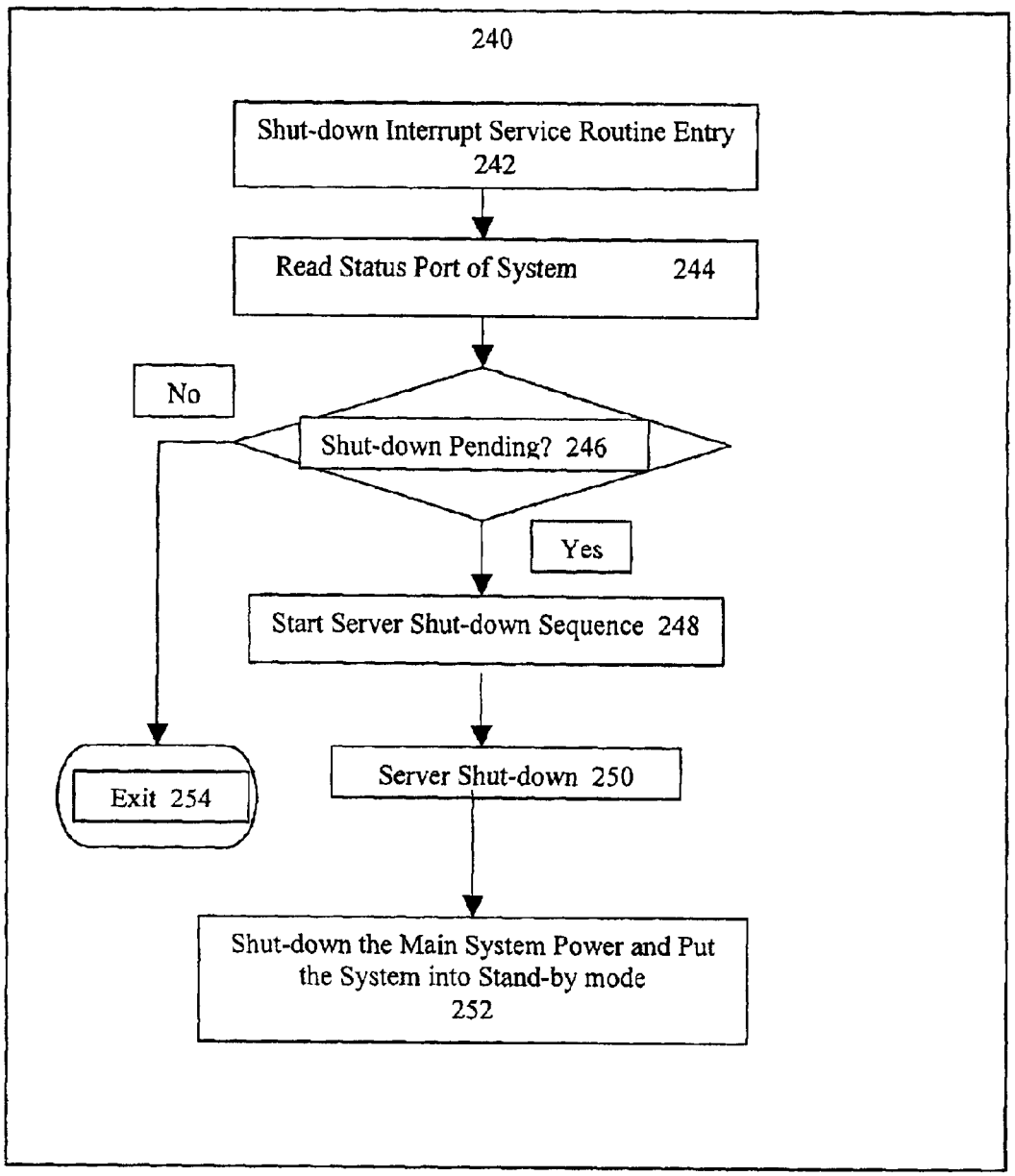
FIG. 8 is a flow chart of one embodiment of a method for a shut down interrupt routine in the system in accordance with the present invention for allowing the computing device to be used as a server.

FIG. 8 is a flow chart of one embodiment of a method 240 for a shut down interrupt routine in the system 100 in accordance with the present invention. The method 240 is preferably implemented in conjunction with the one button shut-down interrupt logic 156. A shut-down interrupt service routine entry is provided, via step 242. A status port of the system 100 is read, via step 244. The status port of the system 100 indicates whether a shut down is pending. It is determined whether a shut down is pending, via step 246. If not, then the method 240 is terminated, via step 254. Otherwise, a shut down sequence for the server is initiated, via step 248. The server is then shut down, via step 250. The main power to the system 100 is then shut down and the system 100 is put into standby mode, via step 252. Thus, the system 100 can be shut down relatively simply and easily.

Figure 9:
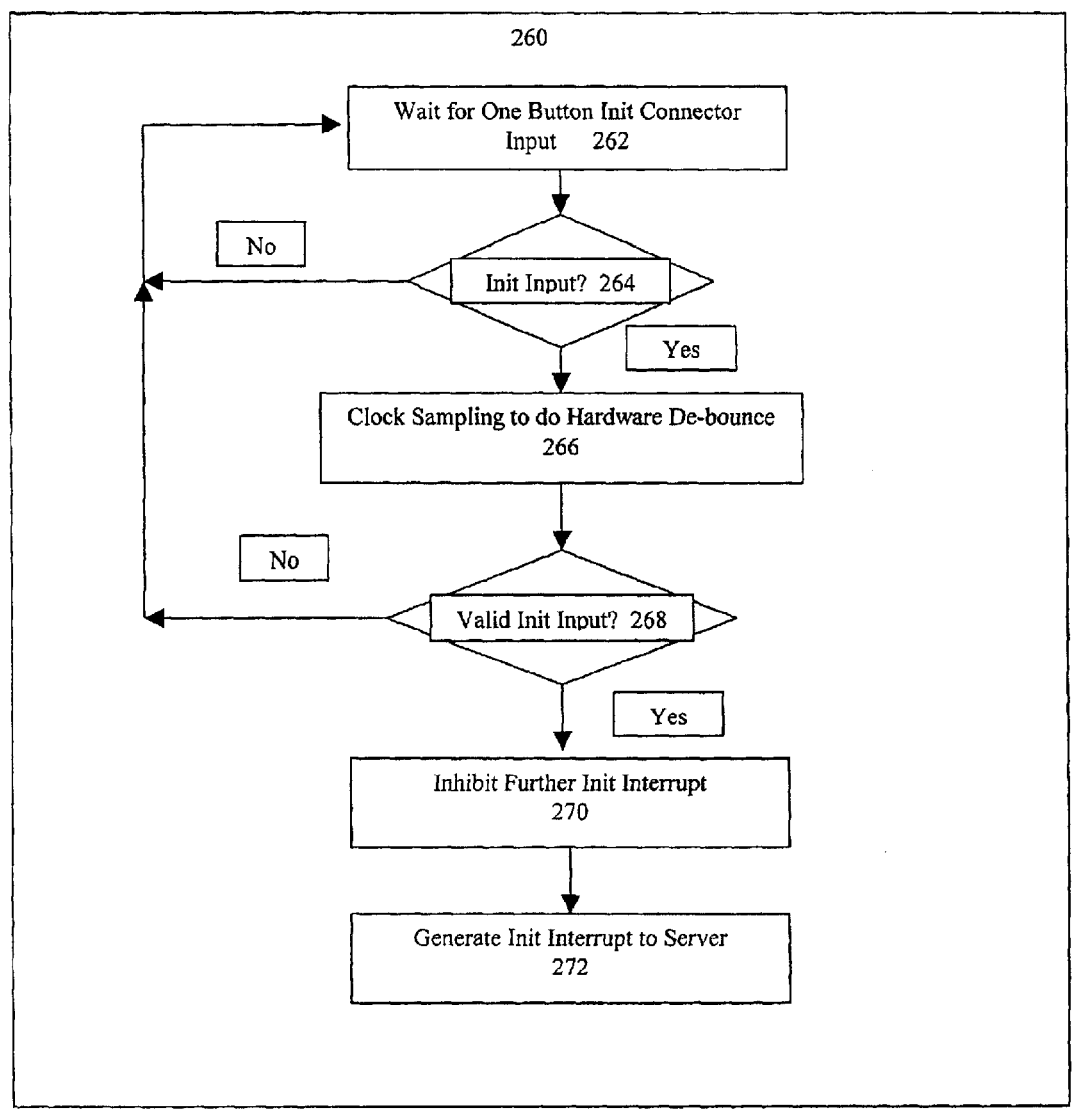
FIG. 9 is a flow chart of one embodiment of a method for using one-button Init interrupt logic as a feature of the system in accordance with the present invention for allowing the computing device to be used as a server.

FIG. 9 is a flow chart of one embodiment of a method 260 for using one-button Init interrupt logic a feature of the system 100 in accordance with the present invention. The method 260 is used in conjunction with the one button Init interrupt logic 160 and the Init connector 112. The one button Init interrupt logic 160 waits for connector input, via step 262. The connector input is preferably a push button (not shown) being depressed. It is determined whether Init input is received, via step 264. If not, step 262 is returned to. Otherwise, clock sampling is performed to allow for hardware de-bounce, via step 266. It is determined whether the Init input received is valid, via step 268. If not, step 262 is returned to. Otherwise, further Init interrupts are inhibited, via step 270. Step 270 ensures that the method 260 can be completed for valid Init input already received. An Init interrupt to the server is then generated, via step 272. The server is thus restored to its default state using the method 260. The return to the default state is preferably found in the default server image 143 residing on the memory 106.

Figure 10:
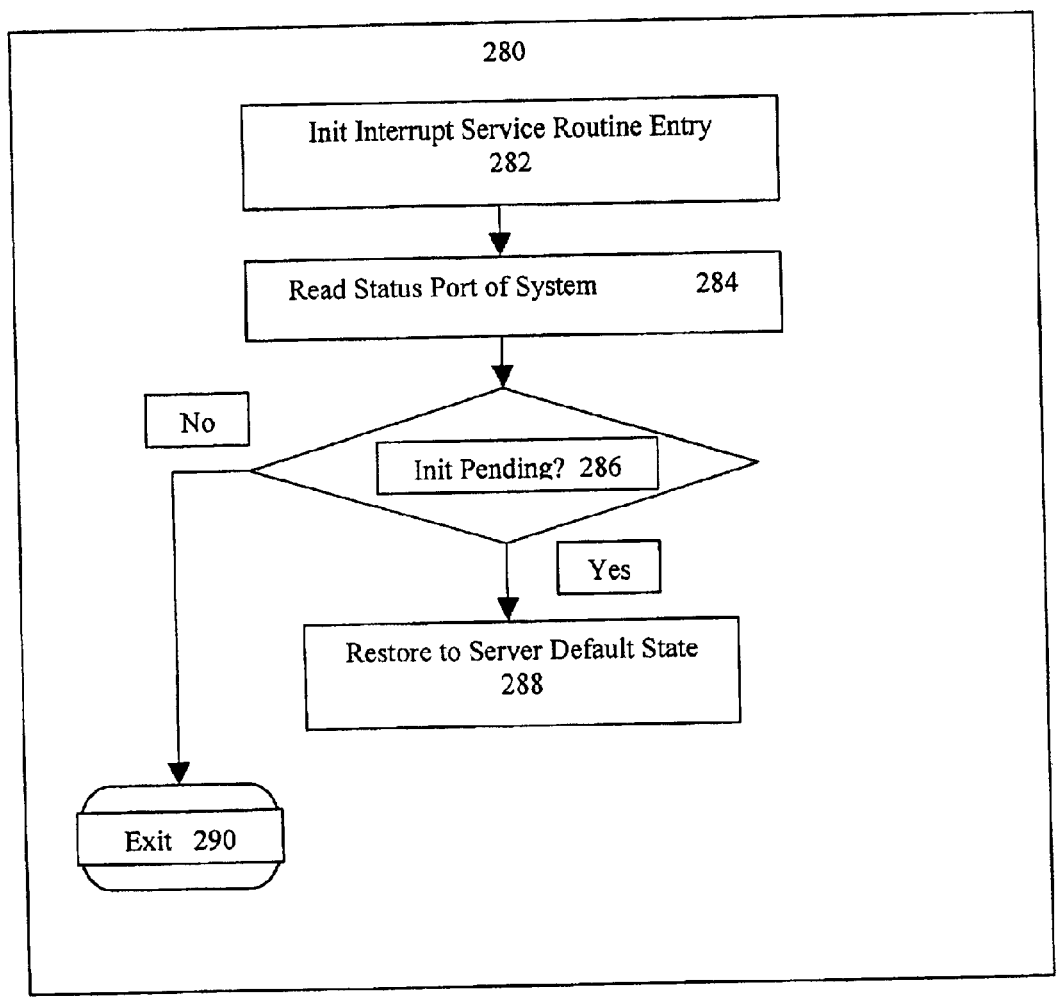
FIG. 10 is a flow chart of one embodiment of a method for an Init interrupt routine in the system in accordance with the present invention for allowing the computing device to be used as a server.

FIG. 10 is a flow chart of one embodiment of a method 280 for an Init interrupt routine in the system 100 in accordance with the present invention. The method 280 is preferably used for performing the step 272 of the method 260.

A Init interrupt service routine entry is provided, via step 282. A status port of the system 100 is read, via step 284. The status port of the system 100 indicates whether an initialization is pending. It is determined whether an initialization is pending, via step 286. If not, then the method 280 is terminated, via step 290. Otherwise, the server is restored to its default state, via step 288. Thus, the system 100 can be initialized relatively simply and easily, by a push of a button by a user.

Figure 11:
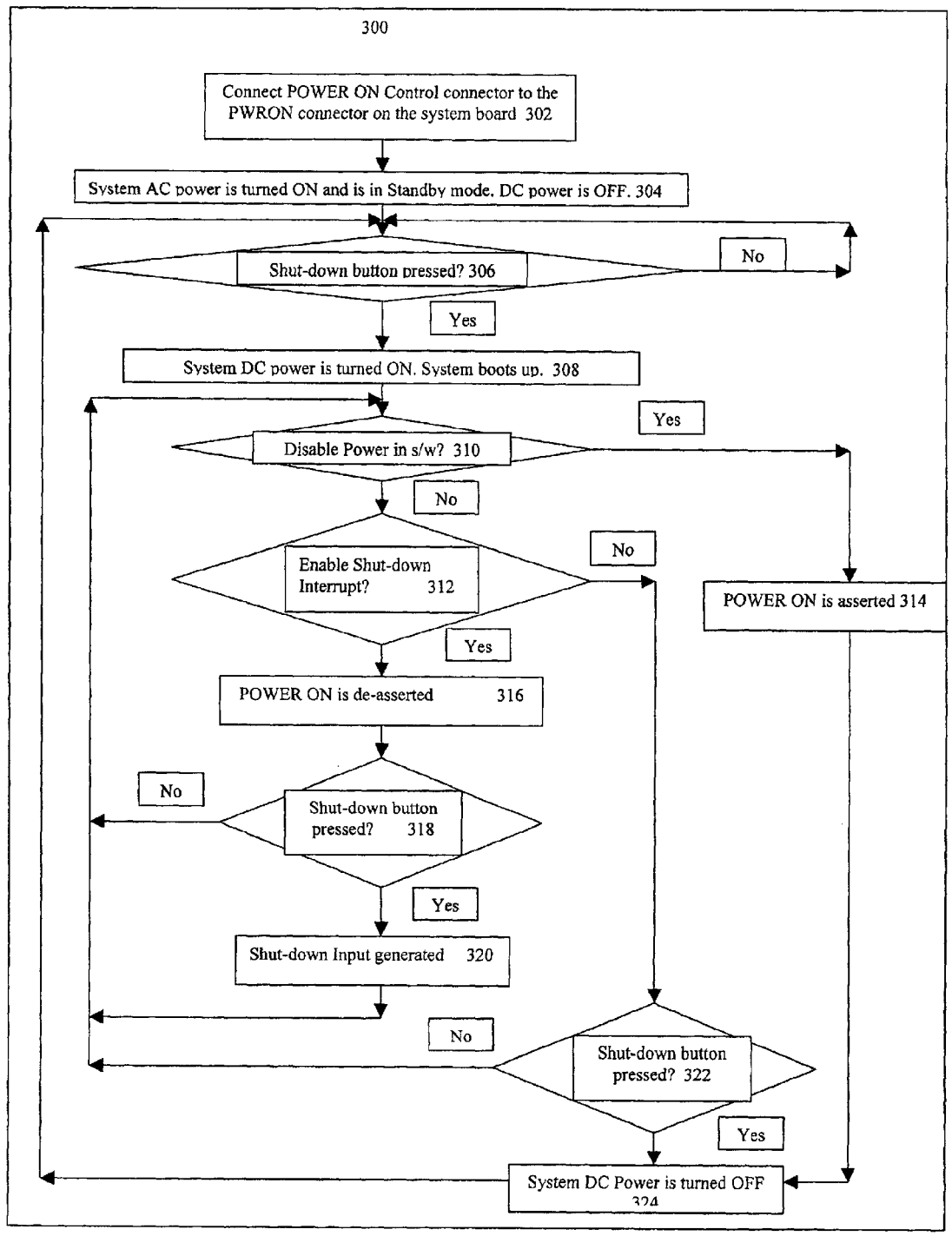
FIG. 11 is a flow chart of one embodiment of a method for using one-button power on control logic as a feature of the system in accordance with the present invention for allowing the computing device to be used as a server.

FIG. 11 is a flow chart of one embodiment of a method 300 for using one-button shut down and power on control logic as a feature of the system 100. The method 300 is preferably performed using the power on control connector 116 and the shut-down connector 114. The power control connector (not shown) of the computing device 10 is coupled with a power-on connector 116, via step 302. The AC power to the system 100 is then turned on, the DC power to the system 100 turned off, and the server of the system 100 placed in standby mode, via step 304. It is determined whether the shut-down button has been depressed, via step 306. If not, step 306 is returned to. Otherwise, DC power for the system 100 is turned on and the system 100 boots up, via step 308. It is then determined whether power is to be disabled, via step 310. If so, then the power on is asserted, via step 314 and the system DC power turned off via step 324. If power is not to be disabled, then it is determined whether the shut-down interrupt is to be enabled, via step 312. If not, it is determined whether the shut-down button has been pressed, via step 322. If so, then the system DC power is turned off, via step 324. Otherwise, the method returns to step 310. If it is determined in step 312 that the shut-down interrupt is to be enabled, power on is deasserted, via step 316. It is then determined whether the shut-down button has been pressed, via step 318. Preferably, step 318 determines whether the shut-down button has been pressed for a particular amount of time. If not, then the method returns to step 310. Otherwise, the shutdown input is generated, via step 320 and step 310 returned to.

Thus, using the method 300, the shut-down button can be used in different ways. If the shut down button is pressed prior to a shut-down interrupt being enabled, then the method 300 allows the DC power to the system 100 to be turned off. If, however, the shutdown interrupt was enabled, as determined in step 312, prior to the shut-down button being pressed, then the shut down input generated in step 320 and the system 100 can be shut down using the method 220. Thus, using the method 300, the shut-down button can be used either to turn off the DC power to the system or to shut down the system 100. Thus, using the methods 220, 240, 260, 280 and 300, additional functions can be provided using the system 100.

A method and system has been disclosed for allowing a computing device to be used as a server. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for providing a server-on-a-board on a computing device, the computing device including at least a processor and an optional mass storage device, the system comprising:

bus interface logic for interfacing between the computing device and the system, the bus interface logic allowing the computing device to detect the system;

a local control BIOS coupled with the bus interface logic, the local control BIOS for booting up the server and preparing the computing device for use as the server; and a memory for storing a server image for the server, the server image being provided to the computing device using the local control BIOS.

2. The system of claim 1 further comprising:

a plurality of control button connectors;

a plurality of buttons, the plurality of control button connectors for allowing the server to be turned on, shut down gracefully, or restored to its initial state, by a single press of at least one of the plurality of buttons connected to the plurality of control button connectors;

a plurality of LED and LCD connectors allowing the system status to be displayed or shown.

3. The system of claim 1 wherein the memory is a flash memory.

4. The system of claim 1 further comprising:

control logic.

5. The system of claim 4 further comprising:

a push button; and wherein the control logic further includes a one-button init connector, coupled with the push button, for restoring the server to a default state in response to the push button being depressed for a particular time.

6. The system of claim 4 further comprising:

a push button; and wherein the control logic further includes a shut-down connector, coupled with the push button, the shut-down connector shutting down the server gracefully if the push button is pressed for a particular time.

7. The system of claim 4 wherein the control logic further includes a power-on connector; and wherein the control logic further includes a power-on connector connecting to the power-on connector of the system board, coupled with the shut-down push button, the power-on connector further turns the power supply on if the push button is depressed when the computing device is supplied with AC power.

8. The system of claim 4 further comprising:

a light emitting diode (LED) connector; and wherein the control logic further includes a status LED connector coupled with the LED for indicating a operating status of the system.

9. The system of claim 4 further comprising:

a light emitting diode (LED) connector; and wherein the control logic further includes a power-on LED connector coupled with the LED for indicating a power status of the system.

10. The system of claim 4 further comprising:

a liquid crystal display (LCD) connector; and wherein the control logic further includes a LCD display connector coupled with the LCD for indicating a operating status of the system.

11. The system of claim 1 wherein the bus interface logic, the local BIOS control logic, a flash memory and a set of control button connectors, light emitting diodes (LED) connectors and a liquid crystal display (LCD) connector are incorporated into a single board.

12. A method for providing a server-on-a-board on a computing device, the computing device including at least a processor and an optional mass storage device, the method comprising the steps of:

(a) providing a board including bus interface logic, a local control BIOS, a flash memory, the bus interface logic for interfacing between the computing device and the system, the bus interface logic allowing the computing device to detect the system, the local control BIOS coupled with the bus interface logic, the local control BIOS for booting up the server and preparing the computing device for use as the server, the memory for storing a server image for the server, the server image being provided to the computing device using the local control BIOS; and (b) allowing a user to utilize the server access using the board.

13. The method of claim 12 wherein the board further includes a plurality of control button connectors, a plurality of light emitting diodes (LED) connectors and a liquid crystal display (LCD) connector, the plurality of control button connectors allowing the server to be turned on, shut down gracefully, or restored to an initial state, by a single press of buttons connected to the plurality of control button connectors, the plurality of LED connectors and the LCD connector allowing the system status to be displayed or shown.

14. The method of claim 12 wherein the memory is a flash memory.

15. The method of claim 12 wherein the board further includes control logic.

16. The method of claim 15 wherein the board further includes a push button; and
wherein the control logic further includes a one-button init connector, coupled with the push button, for restoring the server to a default state in response to the push button being depressed for a particular time.

17. The method of claim 15 wherein the board further includes a push button; and
wherein the control logic further includes a shut-down connector, coupled with the push button, the shut-down connector shutting down the server gracefully if the push button is pressed for a particular time.

18. The method of claim 15 wherein the control logic further includes a power-on connector; wherein the computing device includes a system board; and
wherein the control logic further includes a power-on connector connecting to a power-on connector of the system board for the computing device, coupled with the shut-down push button, the power-on connector further turns the power supply on if the push button is depressed when the computing device is supplied with AC power.

19. The method of claim 15 further comprising the step of:
providing a light emitting diode (LED) connector; and
wherein the control logic further includes a status LED connector coupled with the LED for indicating a operating status of the system.

20. The method of claim 15 further comprising the step of:
providing a light emitting diode (LED) connector; and
wherein the control logic further includes a power-on LED connector coupled with the LED for indicating a power status of the system.

21. The method of claim 15 further comprising the step of:
providing a liquid crystal display (LCD) connector; and
wherein the control logic further includes a LCD display connector coupled with the LCD for displaying a operating status of the system.

22. The method of claim 12 wherein the bus interface logic, the local BIOS control logic, the flash memory and a set of control button connectors, light emitting diodes (LED) connectors and a liquid crystal display (LCD) connector, are incorporated into a single board.

23. A method for providing a server-on-a-board on a computing device, the computing device including at least a processor and an optional mass storage device, the method comprising the steps of:
detecting a system for providing the server using bus interface logic in the system;
accessing a local control BIOS on the system;
using the local control BIOS for preparing the computing device for use as the server and booting up the server, for accessing a memory in the system for storing a server image for the server, the server image being provided to the computing device using the local control BIOS.

24. The method of claim 23 further comprising the steps of:
using a plurality of control button connectors allowing the server to be turned on, shut down gracefully, or restored to its initial state, by a single press of buttons connected to the plurality of control button connectors;
using the LED and LCD connectors allowing the system status to be displayed or shown.

* * * * *